United States Patent [19]

Crue

[11] 4,095,051
[45] June 13, 1978

[54] DEMULTIPLEXER CIRCUIT

[75] Inventor: Charles R. Crue, West Newbury, Mass.

[73] Assignee: Bell Telephone Laboratories, Incorporated, Murray Hill, N.J.

[21] Appl. No.: 750,903

[22] Filed: Dec. 15, 1976

[51] Int. Cl.² ............................................. H04J 3/06
[52] U.S. Cl. ............................................. 179/15 BS
[58] Field of Search ............ 179/15 A, 15 BL, 15 BS; 178/67, 69.5 R

[56] References Cited

U.S. PATENT DOCUMENTS

| 3,809,817 | 5/1974 | Gill | 179/15 BS |
| 4,004,100 | 1/1977 | Takimoto | 179/15 BS |

*Primary Examiner*—David L. Stewart
*Attorney, Agent, or Firm*—John K. Mullarney

[57] ABSTRACT

This disclosure relates to a demultiplexer for a pair of digital groups (digroups) which are synchronously multiplexed into a composite signal by bit interleaving the pair. The composite multiplex signal is coupled to each of a pair of gating circuits. A clock recovery circuit recovers the timing of the composite signal and generates therefrom a pair of phase inverted clock signals. These clock signals are respectively coupled to the two gating circuits to alternately enable the same and thereby steer the interleaved digroup bits to separate digroup receive units. A comparison circuit is coupled to each receive unit to compare the relative timing of the bits delivered thereto; this comparison utilizes the fact that multiplexing is done with the bits of one digroup preceding the bits of the other. If the steering is incorrect and the respective digroup bit streams are being sent to the wrong receive units, the comparison circuit generates a signal which serves to phase reverse the clock signals and consequently the enabling of the gating circuits. This reverses, and thereby corrects, the steering of the digroup bit streams.

5 Claims, 6 Drawing Figures ns. A clock
DEMULTIPLEXER CIRCUIT

BACKGROUND OF THE INVENTION

This invention relates to a demultiplexer for a pair of n-channel digroups (digital groups) that are synchronously multiplexed for transmission purposes.

In recent years, the price of telephone cable has been rising sharply because of the increased cost of copper and petroleum-based plastic. Moreover, in rapidly growing areas of the telephone plant, such as the exchange area, the cost of installing new cables has increased significantly. Furthermore, telephone companies are faced with dwindling duct and manhole space. Clearly, one solution to these problems is to put as much call-carrying capacity as possible into a single pair of wires by using carrier facilities.

The T1 carrier system introduced in 1962 (see "The T1 Carrier System", *Bell Laboratories Record*, Vol. 40, November 1962 by D. F. Hoth, pp. 358–363) was very successful in this regard. T1, by employing pulse code modulation (PCM), encodes 24 voice channels into a 1.544 megabit-per-second digroup signal for transmission over two cable pairs (one for each direction of transmission).

A later digital carrier system, called T1C, has since been developed. T1C has twice the capacity of T1, or 48 high-quality voice channels over two cable pairs and a correspondingly higher line rate of 3.152 megabits-per-second. The great advantage of T1C is of course its increased voice channel capacity, which makes more efficient use of cables, ducts, and manholes; see the article "T1C Carrier: The T1 Doubler", *Bell Laboratories Record*, June 1975, by James F. Graczyk et al, pp. 257–263.

Two asynchronous T1 signals are combined into a T1C signal by bit interleaving the two. This transmission mode necessitates the use of a "pulse stuffing" technique, as well as added framing information (i.e., superframe bits) to separate the composite T1C signal into its two component parts at the receiving terminal.

Whenever possible, it would appear advantageous to synchronously multiplex the two (24-channel) digroup signals. The electronic circuitry associated with "pulse stuffing" can thence be dispensed with, a common, transmitting terminal, clock source can be used, etc. Conventional practice, however, would still seem to suggest the use of additional framing bits in the composite multiplex signal to permit the same to be separated into its component parts at the receiving terminal.

SUMMARY OF THE INVENTION

It is a primary object of the invention to demultiplex a synchronously multiplexed signal consisting of two n-channel digroup signals.

A related object is to demultiplex a pair of synchronously multiplexed digroup signals without the use of additional framing bits in the composite multiplex signal.

A still further object of the invention is to provide an improved, yet greatly simplified, demultiplexer for a pair of n-channel digroups that are synchronously multiplexed for transmission purposes.

The demultiplexer of the invention is advantageously utilized, by way of example, in a communication system wherein a pair of 24-channel digroup signals are synchronously multiplexed into a 48-channel composite signal by bit interleaving the digroup signals.

In accordance with the present invention an incoming composite multiplex signal is coupled to each of a pair of gating circuits for demultiplex purposes. A clock recovery circuit recovers the timing of the incoming signal and generates therefrom two mutually exclusive clock signals, each at the digroup bit rate. These clock signals are respectively coupled to the two gating circuits to alternately enable the same and thereby steer the incoming interleaved digroup bits to separate digroup receive units. A comparison circuit is coupled to each receive unit to compare the relative timing of the bits delivered thereto; this comparison utilizes the fact that multiplexing is done with the bits of one digroup (e.g., A) preceding the bits of the other (e.g., B). If the steering is incorrect and the respective digroup bit streams are being sent to the wrong receive units (e.g., digroup A bits to receive unit B, and vice versa), the comparison circuit generates a signal which alters the phase of the clock signals. The phase of one clock signal is advanced and the other retarded, each by a predetermined amount, to thereby effectively phase reverse the clock signals and consequently the enabling of the gating circuits. This reverses, and hence corrects, the steering of the digroup bit streams. The digroup A bits are thus sent to the A receive unit, and the B bits to the B receive unit.

It is an advantageous feature of the invention that the phase of the clock signals is changed in a manner such that frame synchronism is not lost by the digroup receive units.

BRIEF DESCRIPTION OF THE DRAWINGS

The invention will be more fully appreciated from the following detailed description when the same is considered in connection with the accompanying drawings in which.

DETAILED DESCRIPTION

Figure 1:
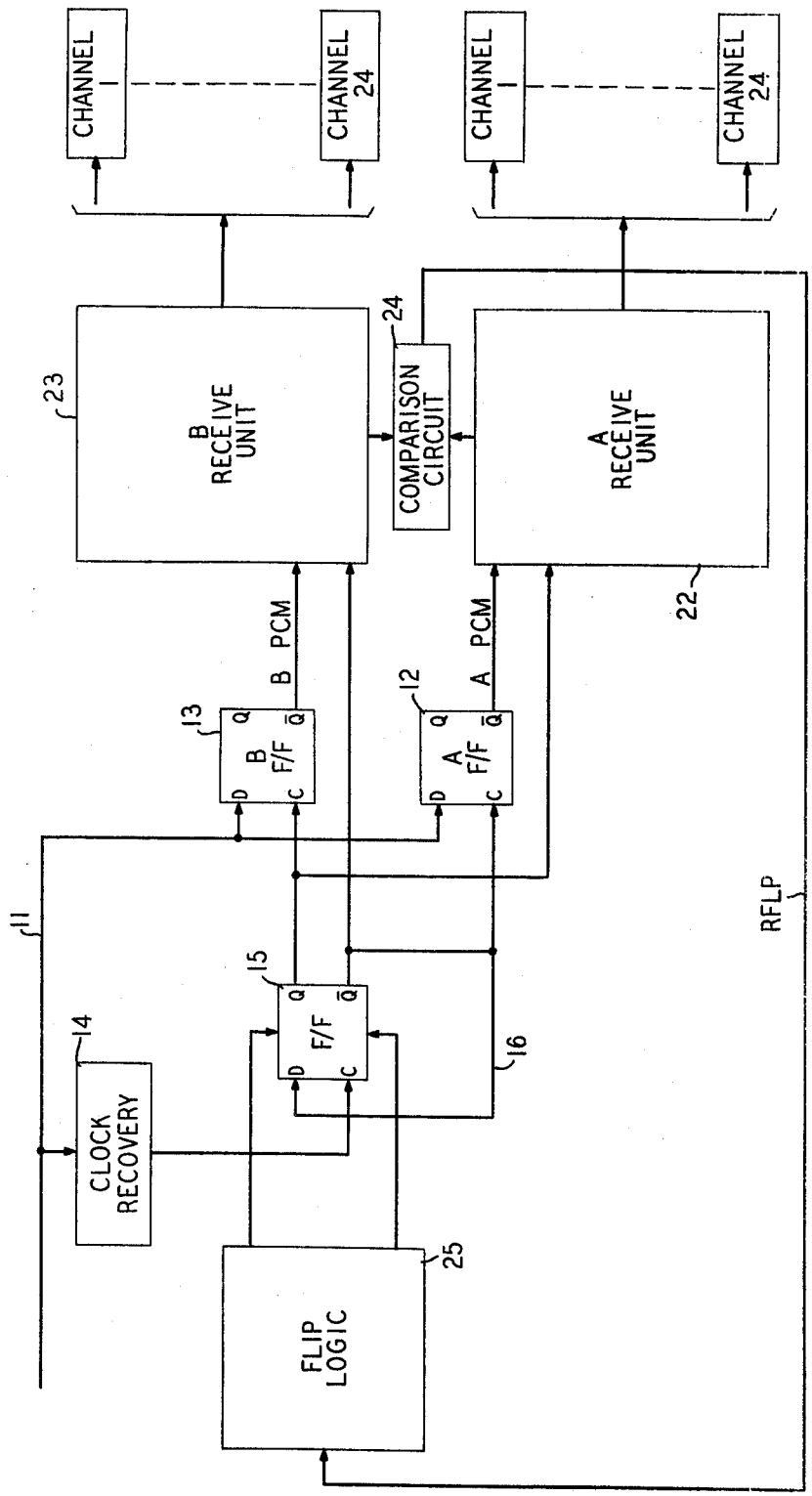
FIG. 1 is a simplified schematic block diagram of a portion of a receiving terminal incorporating a demultiplexer in accordance with the present invention.

Turning now to FIG. 1 of the drawings, there is shown part of a receiving terminal of a communication system which incorporates a demultiplexer circuit in accordance with the present invention. The incoming transmission line 11 carries a multiplexed pair of digital groups (digroups) and, for purposes of illustration, each digroup can be assumed to have a format similar to the data format transmitted over a T1 transmission line (see, for example, the article "The D3 Channel Bank" by W. B. Gaunt et al, *Bell Laboratories Record*, August 1972, pp. 229–233). This format consists of 24 eight-bit words and one framing bit for a total of 193 bits per frame. The 24 words typically represent 24 separate and distinct messages deposited in 24 separate and distinct channels. The words are PCM (pulse code modulation) encoded and the least significant bit (i.e., eighth bit) of a channel is periodically dedicated for signaling purposes. This dedication is discussed in detail in the article by Gaunt et al, supra, but it is of no consequence in the consideration of the present invention.

At the transmitting terminal (not shown), the two 24-channel digroup signals are synchronously multiplexed into a 48-channel line signal (MUXPCM) by bit interleaving the digroup signals. The digroup bit rate is given as 1.544 MHz and thus the composite multiplex signal is at the line rate of 3.088 MHz (2 × 1.544). The multiplexing is carried out with the bits of a given digroup (e.g., A) preceding the bits of the other (e.g., B). Accordingly, the PCM bits from digroup A and digroup B are interleaved to form the sequence: digroup A bit, digroup B bit, digroup A bit, etc. And, consequently, a framing bit ($F_A$) of digroup A will always be followed immediately by the framing bit ($F_B$) of digroup B. The bit interleaving of digroup signals for transmission purposes is old (see the Graczyk article, supra) and the described synchronous multiplexing of digroup signals is an accepted procedure. It is to be understood, therefore, that the transmission terminal constitutes no part of the present invention and it will be obvious to those in the art that the inventive concepts here disclosed can be utilized irrespective of the transmission terminal circuitry and the specific manner in which the transmission line signal is derived.

The incoming composite signal on transmission line 11 is coupled to the A and B demultiplexing flip-flops 12 and 13, and the clock recovery circuit 14 recovers the timing of the incoming signal — i.e., it extracts a 3.088 MHz clock signal therefrom. The flip-flop 15 is provided with the feedback connection 16 and thereby serves as a simple binary divider for the 3.088 MHz clock from the clock circuit 14. Thus, at the Q and $\overline{Q}$ outputs of flip-flop 15, mutually exclusive, 1.544 MHz, QCLK and $\overline{Q}$CLK clock signals are present and connected to the A and B receive units 22 and 23, respectively. The QCLK clock is also connected to the B flip-flop 13 and $\overline{Q}$CLK is connected to the A flip-flop 12. The flip-flops 12 and 13, as well as the flip-flop 15, are positive edge triggered, D-type flip-flops, such as manufactured and sold by Western Electric Company, Texas Instruments, Incorporated, and numerous others.

Figure 2:
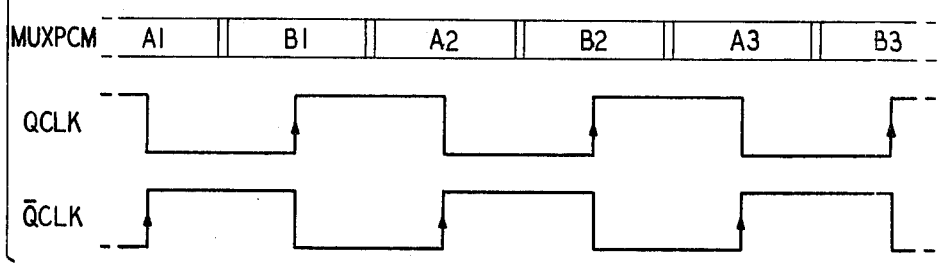
FIG. 2 shows waveforms useful in the explanation of the normal operation of the demultiplexer.

The waveforms of FIG. 2 illustrate the normal operation of the demultiplexer circuit. The incoming multiplex PCM signal MUXPCM is sampled by the QCLK and QCLK clocks and alternate data bits are respectively coupled to the A and B receive units. The QCLK, for example, enables the positive edge triggered flip-flop 13 to sample the digroup B bits (B1, B2, B3 . . .) and couple the same to the B receive unit 23. And the $\overline{Q}$CLK enables the flip-flop 12 to sample the digroup A bits and deliver the A PCM bit stream to the A receive unit 22.

The receive units 22 and 23 can be of a conventional design with circuits similar, for example, to the circuitry used in the D3 Channel Bank, supra. Each receive unit converts the received PCM encoded words into PAM samples, it separates out the signaling bits of each channel, it recovers framing and develops therefrom channel select signals which serve to steer the PAM samples and the signaling bits to the appropriate channel units 1-24, etc. Briefly, the framer of each receive unit examines the received digroup for frame synchronization by comparing the framing bits thereof against a locally generated framing pattern. If the comparison is successful, the digroup is considered in-frame and no corrective action need be taken. If the comparison fails, however, an out-of-frame condition is indicated and a "hunting" procedure is initiated. During hunting or reframing, the data bits are continually "slipped" (i.e., the data bits are successively shifted relative to the locally generated framing pattern) until a successful comparison (i.e., an in-frame condition) is once again realized. Any number of prior art framers (e.g., the framer used in the D3 Channel Bank, supra) are known to operate in the described manner and so no detailed description of the same is deemed necessary for purposes of describing the present invention.

The comparison circuit 24 is coupled to each receive unit for the purpose of comparing the relative timing of the bits delivered thereto. As will be recalled, the multiplexing is carried out with the bits of digroup A preceding the bits of digroup B and, in particular, with each framing bit of digroup A followed immediately by a framing bit of digroup B. Accordingly, if the steering is correct, each framing bit delivered to the A receive unit 22 will precede the framing bit coupled to the B receive unit 23 by one bit position. Whereas, if the steering is incorrect, the framing bits delivered to the A receive unit will follow the framing bits delivered to the B receive unit — i.e., the digroup B bit stream is being delivered to the A receive unit (and vice versa). For the latter case, the comparison circuit 24 generates a signal (RFLP) which the flip logic circuit 25 responds to with properly timed input pulses to the flip-flop 15 to alter the phase of the clock signals QCLK and $\overline{Q}$CLK. The phase of one clock signal is advanced and the other retarded, in the manner to be described in detail hereinafter, to thereby effectively phase reverse the clocks and consequently the enabling of the demultiplexing flip-flops 12 and 13. This reverses, and thereby corrects, the steering of the digroup bit streams.

After start-up or a transmission hit there is a likelihood that the digroup signals will be coupled to the wrong receive units (the digroup A signal to receive unit B and vice versa). Such is the case illustrated in FIG. 4 for the first several bits of the incoming multiplex signal MUXPCM. The QCLK and $\overline{Q}$CLK signals alternately sample the MUXPCM as heretofore described, but in this case the QCLK enables the positive edge triggered flip-flop 13 to sample the digroup A bits (A1, A2, A3 . . .) and couple the same to the B receive unit 23. The waveform labeled BRUPCM shows the PCM bits that are coupled to the B receive unit 23. The $\overline{Q}$CLK signal enables the positive edge triggered flip-flop 12 so as to sample the digroup B bits (B0, B1, B2 . . .) and couple the same to the A receive unit 22 (see waveform labeled ARUPCM). A service affecting situation is thus present and a correction of the steering is required.

Figure 3:
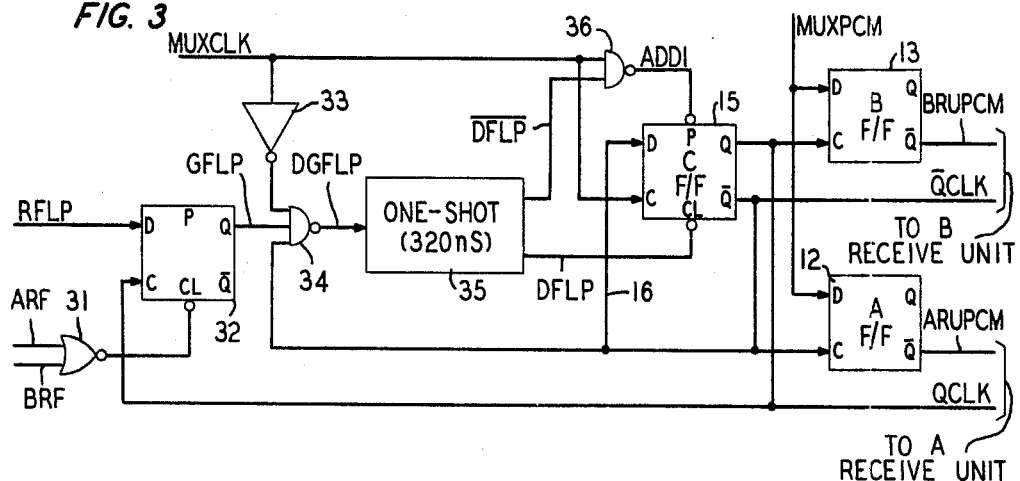
FIG. 3 is a detailed schematic diagram of the demultiplexer of FIG. 1 and, in particular, of the flip logic circuit thereof.

Corrective action is automatic and controlled by the flip logic circuit shown in detail in FIG. 3. The corrective sequence of events is as follows. First, both receive units frame up on their received digroup signals, in the manner briefly described above, and each then delivers a logic "0" signal to the NOR gate 31 (ARF = BRF = 0). This presents a logic "1" to the CL (clear) input of the D-type flip-flop 32 to thereby enable the same. A short time later, the comparison circuit 24 generates a pulse signal (RFLP) which is indicative of incorrect steering and the same is coupled to the D input of flip-flop 32. This pulse is strobed into the flip-flop by a positive going edge of QCLK to obtain the output pulse GFLP shown in FIG. 4. The 3.088 MHz clock signal (MUXCLK) is inverted in the inverter 33, and MUXCLK and QCLK gate GFLP to obtain a delayed pulse DGFLP at the output of NAND gate 34. From FIG. 4 it will be seen that the DGFLP pulse is produced when $\overline{\text{MUXCLK}} = \text{GFLP} = \overline{\text{QCLK}} = 1$. The negative going edge of DGFLP triggers the one-shot multivibrator 35 to produce a negative pulse DFLP of substantially 320 nsec. The pulse DFLP is coupled to the CL (clear) input of flip-flop 15 and forces the $\overline{\text{QCLK}}$ output thereof to remain at logic "1". The other output ($\overline{\text{DFLP}}$) of the multivibrator 35 is gated with MUXCLK via NAND gate 36 to obtain the ADD1 pulse, which is connected to the P (preset) input of flip-flop 15. This results in the Q output of flip-flop 15 (i.e., QCLK) being forced to a logic "1" while ADD1 is present. The ADD1 pulse terminates, before DFLP, and the QCLK signal then reverts to the logic "0" state. Accordingly, the flip-flop 15 is now in one of its two normal, stable states (QCLK = 0, $\overline{\text{QCLK}}$ = 1).

With DFLP and ADD1 having returned to their normal states, the next positive edge of MUXCLK causes the normal divide by two operation to resume but with the QCLK and $\overline{\text{QCLK}}$ signals phase reversed vis-a-vis the MUXPCM bit stream. The QCLK now enables the positive edge triggered flip-flop 13 to sample the digroup B bits (B3, B4 . . . ) and couple the same to the B receive unit 23 (see the BRUPCM waveform). And, $\overline{\text{QCLK}}$ now enables the positive edge triggered flip-flop 12 to sample the digroup A bits (A4, A5 . . . ) and couple the same to the A receive unit 22 (see the ARUPCM waveform). Accordingly, the steering of the digroup bit streams has been automatically corrected and the digroup A bits are thus sent to the A receive unit and the B bits to the B receive unit. As will be appreciated by those in the art, the described function of the flip-flop 15 in response to the input signals coupled thereto is typical of D-type flip-flop operation.

Figure 4:
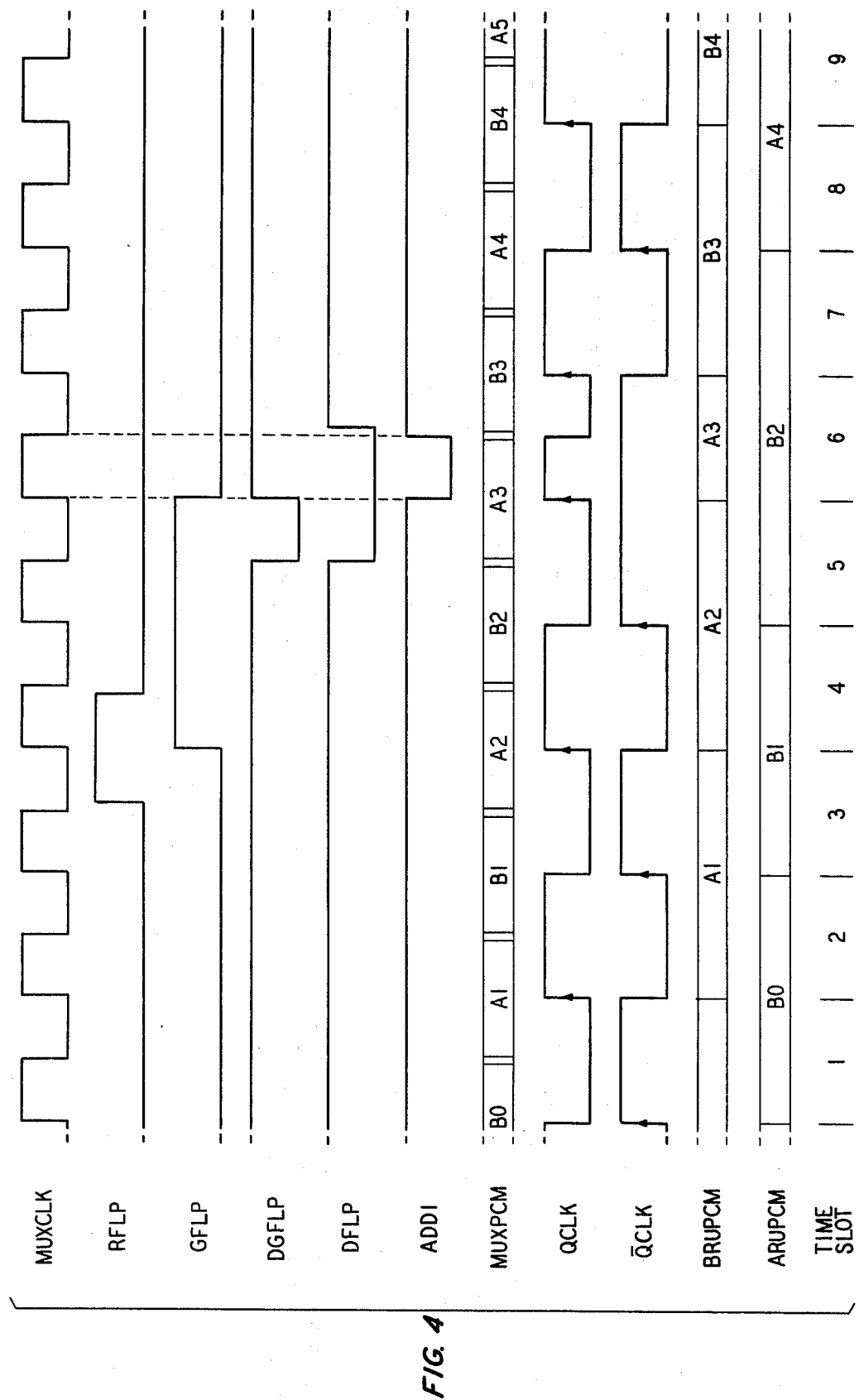
FIG. 4 shows further waveforms useful in the explanation of the invention.

Considering the waveforms of FIG. 4 in more detail, it will be seen that the PCM bit stream coupled to the B receive unit (BRUPCM) includes an extra "three" bit (i.e., the A3 bit of one time slot duration, as well as the B3 bit of normal bit duration). As a result, the bits of the bit stream which follow the flip operation are effectively slipped or retarded by one time slot. Thus, the next framing bit ($F_B$) delivered to the B receive unit will be similarly retarded by one time slot. Unless accounted for, this slippage in the framing bit position could result in loss of frame in the B receive unit.

It will be seen from FIG. 4 that the $\overline{\text{QCLK}}$ signal (which is normally used to steer the digroup A signal to the A receive unit) also slips one time slot due to the flip operation. Thus, the phase change in $\overline{\text{QCLK}}$ matches that of the digroup B bits (B3, B4, B5 . . . $F_B$) delivered to the B receive unit. The $\overline{\text{QCLK}}$ signal is thus sent to the B receive unit to identify the framing bit ($F_B$) to permit a comparison of the same with the locally generated framing pattern. In a typical manner, the framer will count a predetermined number of positive going edges of $\overline{\text{QCLK}}$ (in this case 193) from the preceding framing bit ($F_A$) and then declare the next bit to be a framing bit ($F_B$). Thus, the B receive unit initially frames up on the incorrectly steered framing bits ($F_A$) of digroup A; the digroup steering is corrected, as heretofore described; and the digroup B bits (including $F_B$) are then sent to the B receive unit. In accordance with the invention, however, and in the manner described, this switching of the digroup bit streams is carried out in a manner such that the receive unit does not lose frame requiring a reframe operation.

Comparing the $\overline{\text{QCLK}}$ and BRUPCM waveforms of FIG. 4, it will be seen that the positive going edges of $\overline{\text{QCLK}}$ can be used in the receive unit to mid-bit sample the BRUPCM bit stream. In this case, the A3 bit is skipped, but this is of no consequence.

The PCM bit stream coupled to the A receive unit (ARUPCM) includes no "three" bit (neither an A3 nor B3 bit). As a result, the bits of the bit stream which follow the flip operation (i.e., A4, A5 . . . ) are effectively advanced one time slot. And, the next framing bit ($F_A$) delivered to the A receive unit will be similarly advanced. Here again, this could result in the loss of frame unless accounted for. From FIG. 4, it will be seen that the QCLK signal is also advanced or speeded up one time slot by the flip operation. Thus, the phase change in QCLK matches that of the digroup A bits (A4, A5 . . . $F_A$) delivered to the A receive unit. Accordingly, the QCLK signal is sent to the A receive unit to identify the framing bit ($F_A$) to permit comparison with the local framing pattern of the receive unit. And, here again, the framer will count 193 positive going edges of QCLK from the preceding framing bit ($F_B$) and then declare the received bit to be a framing bit ($F_A$). Thus, the digroup signals (including the embedded framing bits) delivered to the A receive unit are switched, but this is carried out in a manner so as not to lose frame.

From FIG. 4, it will be seen that the positive going edges of QCLK can be used in the receive unit to normally mid-bit sample the ARUPCM bit stream. In this case, the extended B2 bit is double-read, but this is of no consequence.

Figure 5:
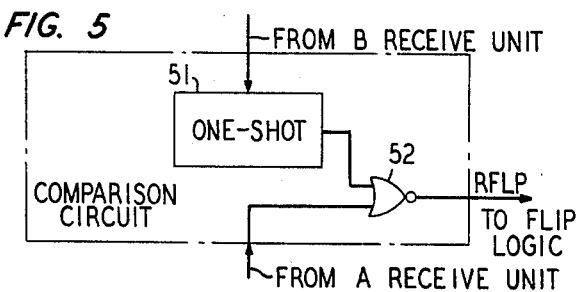
FIG. 5 is a detailed schematic diagram of the comparison circuit of FIG. 1.
Figure 6:
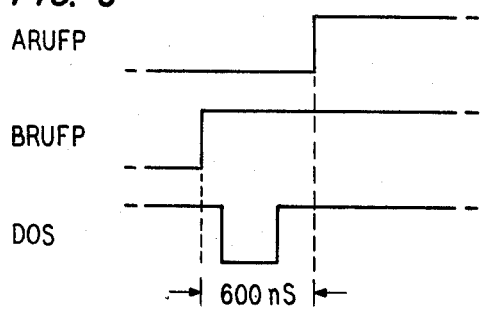
FIG. 6 shows waveforms useful in the explanation of the operation of the circuit of FIG. 5.

The comparison circuit 24 serves to generate the RFLP pulse if the steering of the digroup signals is incorrect. If the steering is incorrect, it will be recalled, the framing bits delivered to the A receive unit will follow the framing bits delivered to the B receive unit — i.e., the digroup B bit stream is being delivered to the A receive unit ( and vice versa). Accordingly, the locally generated framing pattern of the A receive unit will similarly follow or trail the locally generated framing pattern of the B receive unit by an amount equivalent to one bit duration (substantially 600 nsec.). This relative timing is shown in FIG. 6 wherein the A receive unit framing pattern (ARUFP) trails the B receive unit framing pattern (BRUFP) by about 600 nanoseconds. The BRUFP signal is delivered to the one-shot multivibrator 51 of FIG. 5 which produces a negative pulse (DOS) of approximately 300 nsec., as shown in FIG. 6. The DOS pulse of the one-shot is coupled to the NOR gate 52 along with the ARUFP of the A receive unit. Accordingly, since each input to the NOR gate 52 is a logic "0" signal, the NOR gate will provide a logic "1" output (RFLP) of about 300 nsec. This RFLP signal is coupled to the flip logic circuit 25 to correct the steering of the digroup signals as heretofore described.

The present invention has been described by reference to a particular embodiment. It is to be understood, however, that the described embodiment is merely illustrative of the principles and applications of the present invention and numerous modifications may be made by those skilled in the art without departing from the spirit and scope of the invention.

What is claimed is:

1. In a communication system wherein a pair of n-channel digroup signals, each of which includes framing bits, are synchronously multiplexed into a composite signal by bit interleaving the digroup signals, a demultiplexer comprising a pair of gating means to which the composite signal is coupled, means for recovering the timing of said composite signal and for generating therefrom a pair of phase inverted clock signals each at the digroup bit rate, means for respectively coupling said clock signals to said gating means to alternately enable the same and thereby steer the interleaved digroup bits of said composite signal to separate digroup receive units, means for comparing the relative timing of the bits coupled to each of the receive units and for generating a predetermined signal when the digroup bit streams are being sent to the wrong receive units, means responsive to said predetermined signal to advance the phase of one clock signal and retard the phase of the other by a preselected amount to thereby effectively phase reverse said clock signals and reverse the steering of the digroup bit streams, and means for avoiding loss of frame in either receive unit when the steering of the digroup bit streams is reversed.

2. A demultiplexer as defined in claim 1 wherein each clock signal which steers a digroup bit stream to a given receive unit is cross-coupled as a clock signal to the other receive unit.

3. A demultiplexer as defined in claim 2 including means for inhibiting the means responsive to said predetermined signal if either receive unit is out-of-frame.

4. A demultiplexer as defined in claim 1 wherein each of said gating means comprises a D-type flip-flop.

5. A demultiplexer as defined in claim 4 wherein the timing recovery means comprises a D-type flip-flop with feedback connection means for providing a divide by two operation for the recovered timing.

* * * * *